United States Patent [19]

Mitchell et al.

[11] Patent Number: 4,469,547
[45] Date of Patent: Sep. 4, 1984

[54] SPIN-BONDING APPARATUS INCLUDING AN AXIALLY DISPLACEABLE SPINNER MEMBER

[75] Inventors: Gerald L. Mitchell, Creve Coeur; Stephen E. Woerz, Florissant; Thomas J. Setty, Manchester, all of Mo.

[73] Assignee: Boise Cascade Corporation, Boise, Id.

[21] Appl. No.: 570,644

[22] Filed: Jan. 13, 1984

[51] Int. Cl.³ .......................... B29C 27/08; B65B 7/28
[52] U.S. Cl. ...................................... 156/423; 156/69; 156/73.5; 156/497; 156/580
[58] Field of Search ................ 156/69, 73.5, 294, 423, 156/497, 580; 264/68, 248

[56] References Cited

U.S. PATENT DOCUMENTS

| Re. 29,448 | 10/1977 | Brown et al. | 264/68 |
|---|---|---|---|
| 3,316,135 | 4/1967 | Brown et al. | 156/580 |
| 3,690,088 | 9/1972 | Anderson et al. | 156/73.5 |
| 3,824,145 | 7/1974 | Flax | 156/580 |
| 3,982,980 | 9/1976 | Van Manen | 156/73.5 |
| 4,226,652 | 10/1980 | Berg | 156/580 |
| 4,411,726 | 10/1983 | Woerz et al. | 156/580 |

Primary Examiner—Michael Wityshyn
Attorney, Agent, or Firm—Laubscher, Philpitt & Laubscher

[57] ABSTRACT

Improved spin-bonding apparatus is disclosed for connecting a synthetic plastic end closure member to a composite container body wall, including an axially displaceable spinner member that is operable to an axially extended position in which it is rotated relative to the stationary mandrel by the rotatably driven spindle when the mandrel and spindle are in an initial axially spaced condition. The spinner member continuously supports the inner periphery of the sealing fin as the mandrel and spindle are displaced axially together toward their adjacent spin-bonding condition, whereby the sealing fin is protectively supported prior to positive spin bonding thereof to the synthetic plastic inner liner of the container body wall. The stationary mandrel is provided at its free end with a unitary sizing portion having a closely toleranced cylindrical surface for causing the free extremity of the container body wall to have a circular configuration. The spinner member is provided with an annular lead-in ridge at its end adjacent the stationary mandrel, thereby to further protect the free end of the sealing fin during axial displacement of the mandrels.

14 Claims, 9 Drawing Figures

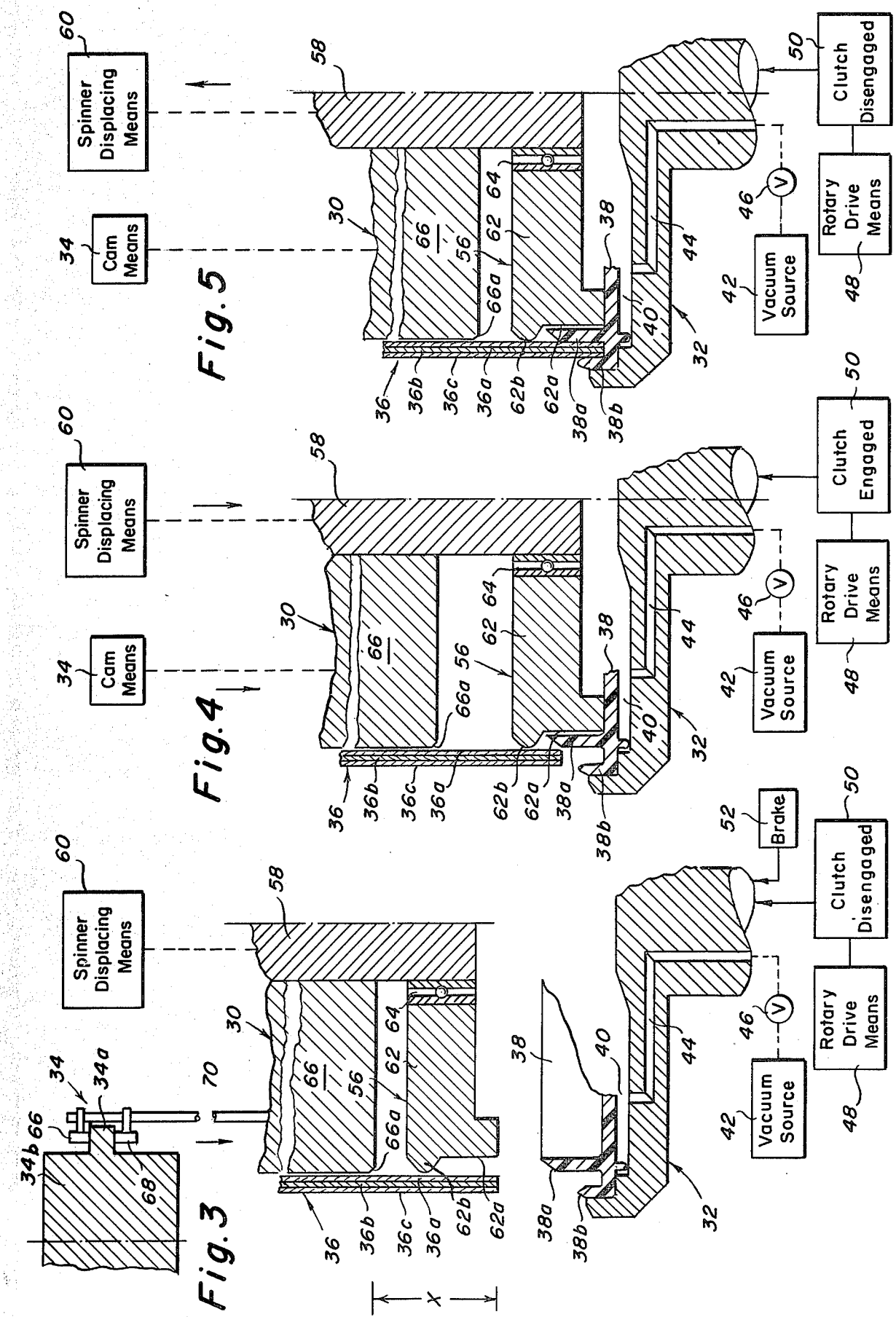

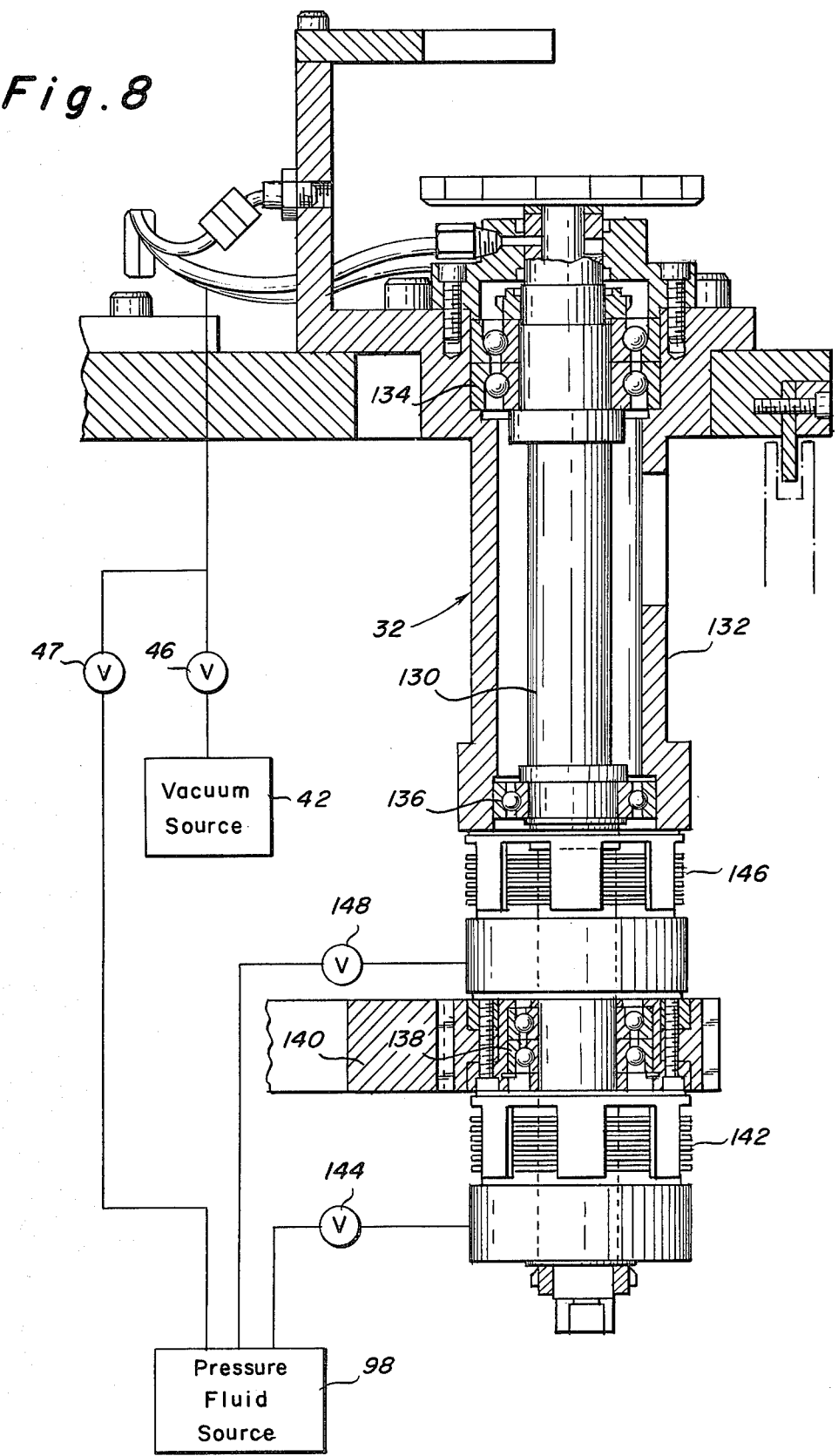

SPIN-BONDING APPARATUS INCLUDING AN AXIALLY DISPLACEABLE SPINNER MEMBER

BRIEF DESCRIPTION OF THE PRIOR ART

As shown by the U.S. patent to Woerz et al., U.S. Pat. No. 4,353,761 (which is assigned to the same assignee as the present invention), it is known in the spin-bonding art to provide a rotary spinner member in the stationary mandrel for supporting an inner sealing fin portion of the end closure member during the spin bonding thereof to the synthetic inner liner layer of the container body wall.

One drawback to the known-spin bonding apparatus is the difficulty in accurately aligning the components during the spin-bonding operation. In most cases, alignment is obtained by providing the parts with a self-aligning design as is achieved, for example, by introducing one part into a convergent groove formed in another part. Another problem is that the parts are often not precisely produced. Thus, two end closures may vary in diameter by as much as 0.016", and a given composite container body wall may be out of round as by as much as 0.030".

Another disadvantage occurs when one of the parts to be spin welded is driven prior to the other part, whereby at least one of the parts is damaged when the parts are brought together. Consequently, any unacceptable amount of misalignment will result in a large number of misassemblies. If alignment and assembly are not accurately controlled, the end will roll back the liner or body, thereby causing a misassembly which will result in a poor seal and ultimate leakage of the product. Control over the alignment is further aggravated by the wide dimensional tolerance ranges of the ends and can bodies. Any type of damage to the end or can body can also prevent proper assembly.

The present invention was developed to avoid the above and other drawbacks of the known spin-bonding systems by assuring positive alignment and assembly of the synthetic plastic closure member to the composite container body wall.

SUMMARY OF THE INVENTION

According to the primary object of the present invention, the spin-bonding apparatus includes a spinner member that is connected for both rotation and axial displacement relative to the non-rotatable mandrel upon which the container body wall is mounted. Thus, when the mandrels are in an axially spaced condition, the spinner means is displaced relative to the non-rotating mandrel to an axially-extended position in which it engages—in sealing fin supporting relation—the end closure member that is supported on the rotary spindle. The rotary spindle, the end closure member and the spinner member are then simultaneously driven to the same rotational velocity, whereupon the drive means are disconnected and the mandrel is displaced toward the rotary spindle to effect the desired spin bonding of the rotating end closure member to the non-rotating container body wall. The spinner is displaced toward its retracted position simultaneously with the displacement of the mandrel means to their adjacent condition, whereby the sealing fin is continuously internally supported as it is introduced within the container and is spin-bonded to the synthetic plastic inner liner layer thereof.

According to another object of the invention, the non-rotating upper mandrel is provided with a unitary closely toleranced sizing portion at one end for "sizing" the associated projecting portion of the composite body wall to a circular cross-sectional configuration, thereby to avoid misalignments which would adversely affect the bonding of the end to the container. The sizing portion has a cylindrical surface that is slightly less than the internal diameter of the container body wall.

A further object of the invention is to provide on the end of the spinner body adjacent the non-rotating mandrel an annular lead-in ridge having an outer diameter which is generally equal to or slightly less than that of the sizing portion, thereby to guide the extremity of the body wall during the insertion of the annular sealing fin therein. Since the sealing fin is internally supported at this time by the remaining cylindrical surface of the spinner member, the sealing fin is protected against scuffing, deformation or damage by the extremity of the container body wall.

Another object of the invention is to provide an improved spin bonding apparatus in which the container body is "rounded-up" or sized to a circular configuration to eliminate the problem of ovality of the can body. Moreover, the sealing fin is internally supported or "sized" by the spinner member to a given uniform outer diameter for spin bonding to the body wall inner liner layer. To this end, the diameter of the spinner cylindrical wall may be slightly greater than the internal diameter of the sealing fin, thereby eliminating dimensional variations inherent in the manufacture of plastic parts.

The plastic end and the can body are brought together in a positive controlled manner for assembly, and minor damage (dings, dents, out-of-roundness, etc.) that the can bodies or plastic ends may have incurred in handling are compensated for prior to assembly. The improved spin bonding process will function at production speeds of 500–600 cans/minute, and will not hinder the sealing process or detract from the performance of the package.

The precise alignment is achieved because the mandrel (holding the can) and the spinner (guiding the end) are journalled together on a common axis, as part of the upper tooling assembly, and are spun together as a unit prior to bonding.

The method of joining the spinner and plastic end prior to rotation assures that there will be no friction developed between the end and spinner which has proven to create scratches and plastic dust and "stringers" in previous methods.

BRIEF DESCRIPTION OF THE DRAWING

Other objects and advantages of the invention will become apparent from a study of the following specification, when viewed in the light of the accompanying drawings, in which:

FIGS. 1 and 2 are diagrammatic and detailed sectional views, respectively, of one known spin-bonding apparatus of the prior art;

FIGS. 3–5 are detailed diagrammatic views illustrating, respectively, the spin-bonding steps of operation of the present invention;

FIG. 7 is a sectional view taken along line 7—7 of FIG. 6;

FIG. 8 is a partially sectioned elevation view of the rotary lower spindle means.

DETAILED DESCRIPTION

Figure 6:
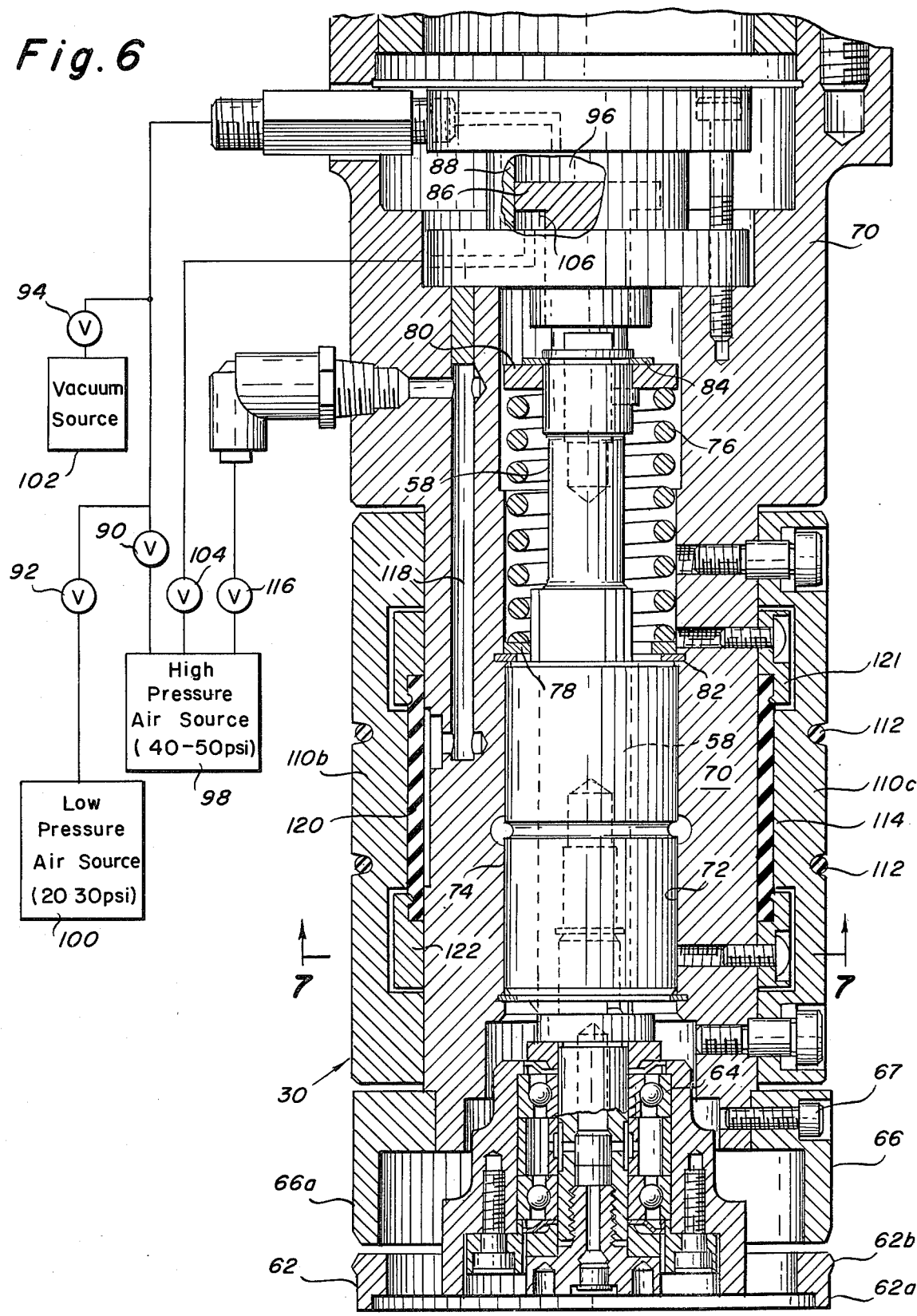
FIG. 6 is a sectional view of the stationary upper mandrel means of FIGS. 3–5.

Referring first more particularly to FIGS. 1 and 2, it is known from the Woerz et al U.S. Pat. No. 4,353,761 to provide rotatably driven mandrel means 2 for rotating a synthetic plastic end closure member 4 relative to a stationary composite body wall member 6 that is clamped to a stationary mandrel 8 by retaining means 10. The composite body wall 6 includes a synthetic plastic inner liner layer 6a, a fibrous body wall layer 6b of paper-board or the like, and a label layer 6c of paper or foil, as is known in the art. The end closure member 4 includes in concentrically spaced relation an annular inner sealing fin 4a that is to be spin bonded to the inner liner layer 6a, and an outer annular flange 4b that is adapted to extend around the outer surface of the container body wall. On its upper surface, the end closure member is provided with a conventional stacking rib 4c.

In order to provide internal support for the sealing fin during the spin bonding operation, a cylindrical spinner member 12 is provided that is connected for free rotation relative to the stationary mandrel 8 by a shaft portion 12a journalled in bearings 14 contained in a corresponding bore in the upper end of the stationary mandrel means. A resilient member 20 is provided on the upper surface of the spinner 12, whereby when the rotatably driven upper mandrel member 2 is lowered by the vertical displacing means 22, the spinner 12 is rotated by the engagement between the resilient member 20 and the end closure member 4. As the end closure member is further lowered to cause the upper free extremity of the composite body to be wedged between the converging walls of the annular space between the sealing fin and the annular outer flange, the sealing fin is internally supported by the spinner 12 (which is now rotating at the same speed as the closure member), thereby causing the sealing fin 4a to be spin bonded to the synthetic plastic inner liner layer 6a.

Referring now to the improved spin bonding apparatus of the present invention illustrated in FIGS. 3–5, the invention includes a vertically displaceable non-rotary upper mandrel means 30 and a rotatable lower spindle means 32 that are relatively axially displaceable between the axially spaced condition of FIG. 3 and the adjacent condition of FIG. 5 by cam means 34 connected with the upper mandrel means 30. The composite container body wall member 36 is mounted concentrically upon the non-rotatable upper mandrel means 30 with the lower extremity of the body wall extending a given distance x below the lower end of the upper mandrel means. Mounted on the rotary lower mandrel means 32 is a synthetic plastic end closure member 38 having concentrically spaced annular sealing fin and outer flange portions 38a and 38b, respectively. The end closure member 38 is normally retained on the rotary lower mandrel 32 by vacuum means including a vacuum chamber 40 connected with vacuum source 42 via an internal conduit 44 and a shut-off valve 46. The rotary lower spindle means is adapted to be driven by rotary drive means 48 connected thereto via clutch means 50, brake means 52 being provided for selectively braking the rotary spindle means 32.

In accordance with the characterizing feature of the present invention, rotary spinner means 56 is provided that is connected both for rotary and axial displacement relative to the non-rotatable upper mandrel means 30. As illustrated diagrammatically in FIGS. 3–5, the rotary spinner means includes a shaft 58 mounted for axial displacement longitudinally of the upper mandrel means 30 by spinner displacing means 60, and a spinner body member 62 rotatably supported on shaft 58 by bearing means 64.

The lower end of the non-rotatable upper mandrel means 30 includes an annular portion 66 having a closely toleranced cylindrical outer surface 66a of a diameter slightly less than the internal diameter of the composite container body wall 36, whereby when the body wall is non-rotatably mounted on the upper mandrel means 30, the downwardly projecting end portion of the body wall is provided with a circular configuration for assuring a positive spin-bonded connection, as will be described in greater detail below. Similarly, the spinner body member 62 includes a closely toleranced outer cylindrical surface 62a the diameter of which is equal to or slightly greater than the internal diameter of the sealing fin portion 38a of the end closure member 38. The spinner member portion also includes adjacent the upper stationary mandrel means 30 an annular lead-in ridge 62b having a diameter slightly less than that of the sizing portion 66a, which lead-in ridge has a smoothly-contoured convex surface. The cam means 34 for axially displacing the non-rotatable upper mandrel means 30 vertically relative to the rotary lower mandrel means 32 includes a rotary cylindrical cam member 34 having on its outer periphery a cam track 34a the upper and lower surfaces of which are engaged by spaced rollers 66 and 68 on the cam follower linkage 70 the lower end of which is connected with the upper mandrel means 30.

Referring now to FIGS. 6 and 7, the non-rotatable mandrel means 30 includes a mandrel body 70 containing a longitudinal through bore 72 in which is mounted slide bearing means 74 that slidably receive the longitudinally displaceable spinner spline shaft 58. Spinner body 62 is rotatably mounted in the lower end of shaft 58 by bearing means 64, the shaft being biased upwardly toward its illustrated retracted position by compression spring 76 that reacts with washers 78 and 80 which engage split lock rings 82 and 84 connected with the mandrel body and the shaft, respectively. Pressure fluid motor means including a piston 86 and cylinder 88 are provided for operating the shaft 58 between its retracted and extended positions. Valve means 90, 92 and 94 are provided for selectively connecting the upper motor chamber 96 with high pressure air source 98, low pressure air source 100, and with vacuum source 102, respectively.

The lower sizing portion 66 of the upper mandrel means 30 comprises a removable annular section that is fastened to the lower end of the upper mandrel body by bolts 67, which sizing section, as indicated above, has a closely toleranced external surface the diameter of which is slightly less than the internal diameter of the container body wall 36. Mounted for radial displacement on the outer periphery of the upper mandrel body 70 adjacent the annular sizing section 66 are a plurality of circumferentially arranged sections 110a, 110b and 110c that are normally biased radially inwardly toward the collapsed condition by circumferentially arranged tension springs 112. These sections are radially outwardly displaceable toward an expanded condition in engagement with the inner periphery of the container body wall by inflatable air bag means 114 that is selectively supplied with pressure air from source 98 via valve 116 and internal conduit 118. The air bag means includes a resilient tubular diaphragm 120 the upper and lower ends of which are clamped to the mandrel body by the sectional clamping rings 121 and 122, respectively.

The rotary lower spindle means 32 includes a spindle shaft 130 rotatably supported within the lower mandrel housing 132 by longitudinally spaced bearing means 134, 136, 138. The spindle shaft 130 is rotatably driven by drive gear means 140 selectively connected thereto via clutch means 142 operable by fluid pressure supplied from source 98 via control valve 144. When in a freely-rotating disconnected condition, the spindle 130 may be braked by brake means 146 supplied with pressure fluid from source 98 via control valve 148.

Figure 9:
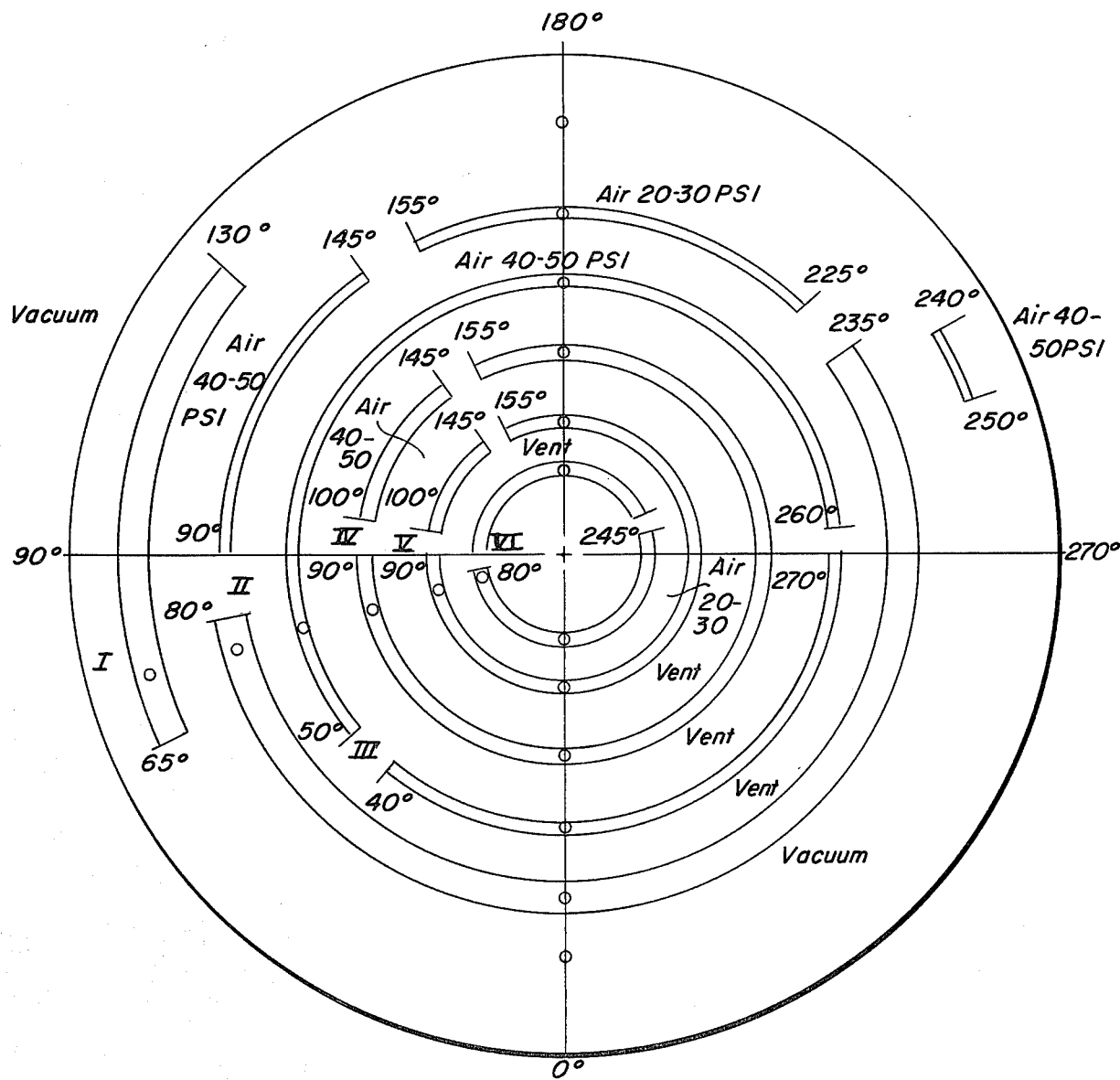
FIG. 9 is a diagrammatic view of a valve timing system for controlling the operation of a multi-station spin-bonding machine.

A plurality of mandrel stations may be provided for simultaneously spin-bonding a plurality of synthetic plastic end closure members to a plurality of composite body wall members, respectively, thereby to effect maximum commercial production of the apparatus. To this end, use may be made of a common cam track 64a (FIG. 3) for selectively operating the mandrels between their axially spaced and adjacent conditions, respectively. Moreover, use may be made of a common rotary air pressure timing valve device as shown somewhat diagrammatically in FIG. 9. In this device, the concentrically arranged control tracks I, II, III, IV, V and VI control, respectively, the vacuum supplied to the lower mandrel, the vertical displacement of the rotary spindle means, the radial expansion of the upper mandrel sections to secure the container body thereon, the clutch operation of the even numbered stations, the clutch operation of the odd numbered stations, and the operation of the spindle brake means.

OPERATION

Assume that the composite container body wall 36 is mounted on the upper mandrel means 30 as shown in FIG. 3, the lower end of the body wall extending a given distance x below the lower end of the upper mandrel. The composite body wall includes, as is conventional in the art, a synthetic plastic liner layer 36a, a fibrous body wall layer 36b, and an outer label layer 36c. Assume also that valve 94 is open to connect chamber 96 with vacuum, thereby to assure that the spinner means 56 is in the retracted condition relative to the upper mandrel, that the synthetic plastic end closure member is arranged on the lower spindle platform, that the upper mandrel sections 110 are in the retracted condition, and that the clutch 142 is disengaged and that the brake 146 is engaged, thereby to maintain the lower mandrel stationary.

Valve 116 is now operated to inflate the expansible diaphragm 120 to radially displace outwardly the upper mandrel sections 110a, 110b, 110c, thereby to non-rotatably fasten the body wall member 36 to the non-rotatable upper mandrel. Owing to the unitary sizing section 66 fastened to the lower end of the upper mandrel body 70, the lower projecting extremity of the container body wall is "sized" to a circular cross-sectional configuration. Just prior to displacement of the mandrel means by the cam means 34 from the axially spaced condition toward the adjacent condition, valve 46 is opened to cause the end closure member 38 to be maintained by vacuum on the rotary spindle platform. The brake means 146 is then de-activated by closing valve 148, and valve 94 is closed to disconnect vacuum source 102 from chamber 96. Valve 90 is now opened to supply high pressure air to chamber 96, whereupon the spinner shaft 58 is displaced downwardly against the force of spring 76 to place the spinner means 56 in its extended position in engagement with the end closure member, as shown in FIG. 4. Valve 144 is now opened to operate clutch 142 to an engaged condition, whereupon the spindle shaft 130, end closure member 38 and the spinner body 62 are driven at the same rotational velocity by the drive means 140. Since the diameter of the spinner body is equal to or slightly greater than the inner diameter of the sealing fin portion 38a, the sealing fin is now internally supported by the spinner member. Valve 144 is now closed to operate the clutch means 142 to a disengaged condition, and as the mandrels continue to be relatively displaced together by the cam means 34, the lead-in ridge 62b on the spinner member 62 guides the extremity of the container body wall during the progressive insertion of the sealing fin therein, and serves to protect the extremity of the sealing fin against scuffing, deformation or other damage. During further movement of the mandrels together, valves 46 and 90 are closed, whereupon the end of the body member 36 is progressively introduced into the annular space between sealing fin 38a and the flange 38b. Owing to the internal support provided the sealing fin by the spinner member, the rotational velocity of the closure member 38 relative to the stationary body wall 36 produces sufficient frictional heat to bond the sealing fin 38a to the inner liner layer 36a. Valve 92 opens to supply low pressure air to the upper pressure motor chamber for a short period of time, whereupon the valve 92 is closed and valve 94 is opened, thereby to connect the upper chamber with vacuum to assure that the piston 86 and the spinner shaft 58 are retracted to their initial retracted positions. Valve 47 is opened for a short period of time to supply high pressure air to the rotary spindle platform to assure total removal of any end closure member therefrom, whereupon valve 148 is opened to reapply the brake 146 to the spindle 130. Valve 116 is now closed to permit radial inward collapse of the mandrel sections by the springs 112, thereby to permit downward removal of the container body (with the end closure member spin-bonded thereto) from the upper mandrel means.

The sizing section 66 of the upper mandrel is closely toleranced 0.003" under the nominal I.D. of the can body for holding the open end of the can body (which is to receive the plastic end) to as precise a diameter as possible. The balance of the can body is loosely supported by the collapsed mandrel sections at a diameter less than that of the sizing section—nominally, 0.045" less than the sizing diameter. The importance of this feature requires an understanding of the nature of composite cans. Since the body wall thickness is very small in relation to the overall diameter of the container, the can is easily made oval (elliptical) during handling. The sizing section forces the minor diameter of the ellipse to be no less than 0.003" under the nominal diameter. The synthetic plastic ends are "sized" by the spinner cylindrical surface while being held at the same time by the driving spindle which imparts rotary motion to the end prior to assembly. The diameter of the lower portion of the spinner is sized to be 0.001" larger than the maximum anticipated sealing fin inside diameter.

In this way, smaller ends will be expanded by the spinner (or "sized") to the correct diameter for assembly. The "lead-in ridge" 62b is provided to assure that the sealing fin of the end will not interfere with the leading edge of the can body during assembly. The diameter of the lead-in ridge is 0.002" smaller than the sizing section so as not to interfere with the internal diameter of the can body, which could detract from the sealing process.

It is the method of bringing the apparatus together that provides precise alignment and proper assembly of cans and ends. At the infeed station, the can is loaded onto the round mandrel and the ends are loaded onto the driving mandrel.

What is claimed is:

1. Apparatus for spin bonding to one end of a tubular composite container body wall having a synthetic plastic liner layer a synthetic plastic end closure member having annular concentrically spaced inner sealing fin and outer flange portions comprising
    (a) non-rotatable mandrel means for supporting the body wall in a stationary condition in which one end of said body wall projects a given distance beyond one end of said stationary mandrel means;
    (b) rotary spindle means arranged coaxially of said non-rotatable mandrel means for supporting said end closure member with the sealing fin and outer flange portions thereof extending toward said non-rotatable mandrel means;
    (c) means for relatively axially displacing said mandrel and said spindle means between adjacent first and axially spaced second conditions, respectively;
    (d) rotary spinner means connected with said one end of said non-rotatable mandrel means for free rotation about the longitudinal axis thereof, said spinner means also being connected for axial displacement between retracted and axially extended positions relative to said non-rotatable mandrel means;
    (e) means for axially displacing said spinner means between its extended and retracted positions, respectively, said spinner means being in engagement with the end closure member when said spinner means is in the extended position and said mandrel and spindle means are in the axially spaced condition, said spinner means having a cylindrical outer surface for supporting the inner peripheral surface of the sealing fin;
    (f) drive means operable when the mandrel and spindle means are in the axially spaced condition and the spinner means is in the extended position for driving said spindle mandrel means and said spinner means to a given rotational velocity; and
    (g) means for disengaging said drive means from said rotary spindle means, thereby to permit free rotation of said rotary spindle means and said spinner means;
    (h) said spinner displacing means being operable to displace said spinner means from the extended position to the retracted position as the mandrel and spindle means are relatively displaced from the axially spaced condition to the adjacent condition, respectively, thereby to support the sealing fin when the projecting extremity of the container body wall is axially introduced into the annular space between the sealing fin and the annular flange, and to spin bond the sealing fin to the container body wall inner liner layer.

2. Apparatus as defined in claim 1, wherein said non-rotatable mandrel means includes at said one end a unitary annular sizing portion having a closely toleranced cylindrical outer peripheral surface the diameter of which is slightly less than that of said container body wall, thereby to cause said projecting body wall portion to have a circular cross-sectional configuration.

3. Apparatus as defined in claim 2, wherein said spinner means includes on its cylindrical surface adjacent said non-rotatable mandrel means an annular lead-in ridge having a diameter that is slightly smaller than the diameter of said non-rotatable mandrel unitary sizing portion, thereby to guide the free extremity of the container body wall and to protect the free extremity of the sealing fin during introduction of the body wall into the annular space between the sealing fin and annular flange portions.

4. Apparatus as defined in claim 3, wherein the diameter of said non-rotatable mandrel sizing portion is about 0.003" less than the internal diameter of the container body wall, and wherein the diameter of said lead-in ridge is about 0.002" less than the diameter of said sizing portion.

5. Apparatus as defined in claim 4, wherein the diameter of the cylindrical surface of said spinner means is about 0.001" greater than the internal diameter of the sealing fin.

6. Apparatus as defined in claim 3, wherein said non-rotatable mandrel means includes a mandrel body containing a longitudinal bore; wherein said spinner means includes a shaft mounted for axial displacement within said bore, and a spinner member rotatably connected with one end of said shaft; and wherein said spinner displacing means comprises first pressure fluid motor means connected with the other end of said shaft.

7. Apparatus as defined in claim 6, and further including first spring means biasing said shaft toward the spinner retracted position.

8. Apparatus as defined in claim 6, wherein said spinner member includes a hub portion arranged concentrically about said shaft, said spinner means including ball bearing means mounted between said hub portion and said shaft, said hub portion extending in concentrically spaced relation within said non-rotatable mandrel sizing portion.

9. Apparatus as defined in claim 8, wherein said unitary sizing portion comprises an annular section connected with one end of said mandrel body in concentrically spaced relation about said spinner hub portion.

10. Apparatus as defined in claim 8, wherein said non-rotatable mandrel means includes on its outer periphery adjacent said unitary sizing portion a plurality of circumferentially arranged sections connected for radial displacement between retracted and expanded positions relative to said non-rotatable mandrel body, spring means normally biasing said mandrel sections radially inwardly toward their retracted position, and second pressure fluid motor means for displacing said sections radially outwardly toward their extended position, thereby to mount the container body against rotation, said mandrel sections defining in the retracted position an effective mandrel circumference the diameter of which is slightly less than the diameter of said unitary sizing portion.

11. Apparatus as defined in claim 10, wherein the effective diameter of said non-rotatable mandrel sections is about 0.045" less than the diameter of said sizing portion.

12. Apparatus as defined in claim 1, wherein said drive disengaging means includes a clutch; and further including brake means for braking the rotation of said rotary spindle means when said clutch means is in the drive disengaging condition.

13. Apparatus as defined in claim 12, and further including vacuum means for releasably mounting said end closure member on said rotary mandrel shaft.

14. Apparatus as defined in claim 13, wherein said non-rotatable mandrel means includes expansible means for mounting the container body thereon; andfurther including timing means for controlling the relative operation of said vacuum means, said spinner displacing means, said non-rotatable mandrel expansion means, said clutch, and said brake means.

* * * * *